A. Chambers,
Feed Trough.
No. 93,673.    Patented Aug. 17, 1869.
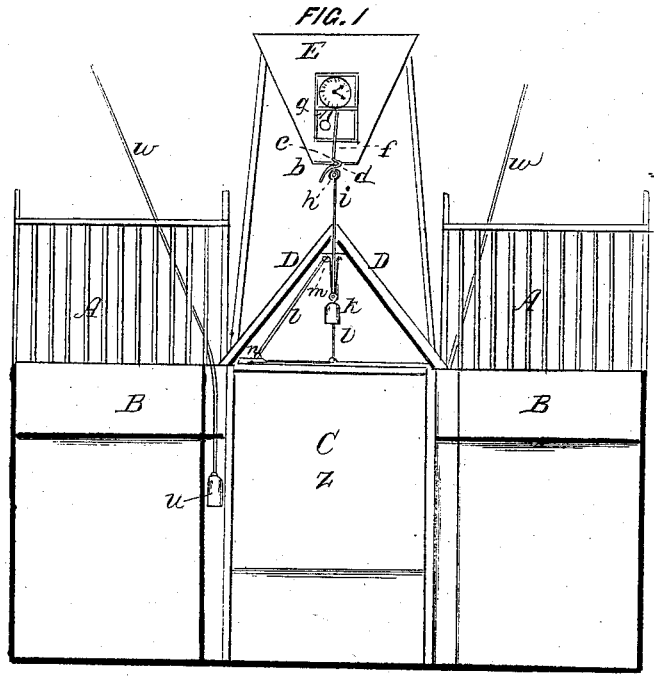
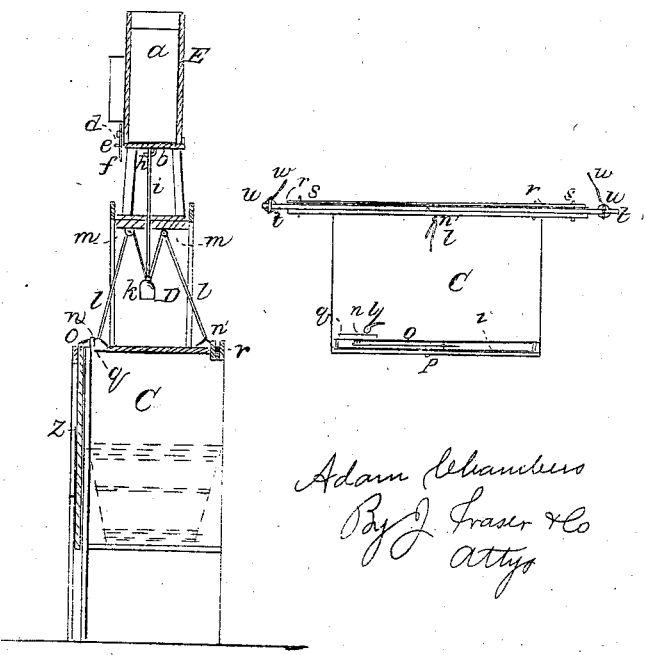
Witnesses.
R. F. Osgood
Geo. W. Mratt
Adam Chambers
By J. Fraser & Co
Attys

United States Patent Office.

ADAM CHAMBERS, OF UNIONVILLE, NEW YORK.

Letters Patent No. 93,673, dated August 17, 1869.

IMPROVEMENT IN MANGERS.

The Schedule referred to in these Letters Patent and making part of the same.

*To all whom it may concern:*

Be it known that I, ADAM CHAMBERS, of Unionville, in the county of Monroe, and State of New York, have invented a certain new and useful Improvement in Mangers; and I do hereby declare that the following is a full and exact description thereof, reference being had to the accompanying drawings, making part of this specification, in which—

Figure 1 is an elevation of the manger, as adapted for two horses.

Figure 2, a vertical cross-section of the same.

Figure 3, a plan of the water-compartment.

Like letters of reference indicate corresponding parts in all the figures.

This improvement is of that kind where clock-work is employed to open or present the feed to the animal at a given hour.

The invention consists in connecting the apparatus for opening or presenting grain, hay, and water, with an ordinary alarm-clock, through the medium of a single connection, thereby greatly simplifying and cheapening the cost of the apparatus, and rendering it more effective and reliable in use.

In the drawings, the arrangement is shown as adapted to two stalls, the action being double for the purpose.

A A represent the ordinary hay-racks, and

B B, the feed-boxes.

Midway between these is located the water-compartment or box C, of sufficient capacity to hold a tub or tank of water.

Above this is a double-inclined chute, D, leading to the feed-boxes, and still above this, a double-chambered hopper, E, divided by vertical partition $a$, and adapted for holding the grain to be given the animals at any one time.

This hopper being located directly over the apex of the chute, insures the division of the grain when it falls, so that it will be properly divided to run to the feed-boxes B B.

It is manifest that a single, instead of a double arrangement of the manger, as above described, may be employed to accommodate a single animal, or, if desired, the capacity may be increased so as to accommodate a larger number of animals.

On the under side of the hopper is hung a trap-door, $b$, opening downward, being held up at the swinging end by a pin, $e$, which engages with a catch, $d$, of pivoted arm $f$.

At the given hour for the discharge of the feed, this arm is struck by the hammer $g$ of the alarm-clock, which drives the catch from its engagement with the pin, thereby releasing the trap-door, and allowing the feed to fall from the hopper.

To the under side of the trap-door is secured an open hook, $h$, and with this engages the eye of a single connection or rod, $i$, having a weight, $k$, at its lower end.

With this weight are connected two cords $l\ l$, passing upward over pulleys $m\ m$, and thence downward, and having pins $n\ n'$, at their ends.

The front of the water-compartment is provided with a slide-door, $z$, of sufficient size to cover the water-tank when set.

The top of this door has a pivoted lever, $o$, which turns or doubles over a fulcrum, $p$, near the joint, and is retained in that position to hold the door up, by the pin $n$ passing through a socket, $q$, so as to project over it. If desired, the lever $o$ may be dispensed with, and the pin simply run through a hole in the door. When the pin is drawn out, the door will fall, thus opening the water-tank to the animal.

On the rear of the water-compartment are two levers $r\ r$, pivoted at $s$, and having their ends $t\ t$ projecting, to receive weights $u\ u$.

The long ends of these levers lap one over the other, and are retained in position by the pin $n'$, projecting over them similarly to $n$ over $o$.

With the weights $u\ u$ are connected cords $w\ w$, which extend up into the loft over the racks, and have bundles of hay attached, so that when the weights fall, the bundles will be drawn into the racks.

Where but a single animal is to be fed, but a single lever, $r$, and weight $u$, are employed.

The operation is as follows:

The moment the hammer of the alarm-clock strikes the pivoted wire $f$, the trap-door $b$ falls, thereby releasing the weighted connection $i$.

As this falls, the cords $l\ l$ draw out the pins $n\ n'$, from their connection with levers $o\ r$, thereby allowing the door $z$, and the weights $u$, to fall, and by this means, presenting the grain, the hay, and the water, to the animal, at one and the same time.

I am aware that clock-work has been before applied to mangers, as in the patent of Denser & Miller, September 17, 1867, (No. 68,956.) Such I expressly disclaim. My invention is an improvement upon that construction.

In that case, a special arrangement of the clock-work is necessary, which makes it expensive, as the clocks must be made to order.

My invention is of such a character that an ordinary alarm-clock can be employed, the alarm-hammer acting as the power to disengage the parts, to produce the desired action. This, in itself, is a matter of considerable importance.

In addition to the above, my arrangement is essentially different from that referred to.

It accomplishes the triple action of presenting hay, grain, and water, to the animal, at a given hour.

This action is accomplished in the simplest manner, and through the medium of a single connection, $i$, with the clock-work.

I disclaim broadly the application of clock-work to mangers, as I am aware, as before stated, that the same has been before used, but in a different manner.

What I claim as my invention, and desire to secure by Letters Patent, is—

The arrangement of the pivoted catch-wire $f$, weighted rod $i$, and cords $l\ l$, provided with pins $n\ n'$, when combined with the doors $b\ z$, and weighted cords $w\ w$, in the manner and for the purpose specified.

In witness whereof, I have hereunto signed my name, in the presence of two subscribing witnesses.

ADAM CHAMBERS.

Witnesses:
   Wm. H. Denniston,
   George Leonbaker.